US009770016B2

(12) United States Patent
Chan

(10) Patent No.: US 9,770,016 B2
(45) Date of Patent: Sep. 26, 2017

(54) SPINNING REEL

(71) Applicant: Shimano Components (Malaysia) SDN. BHD., Pontian, Johor (MY)

(72) Inventor: Yik Hui Chan, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 63 days.

(21) Appl. No.: 14/956,905

(22) Filed: Dec. 2, 2015

(65) Prior Publication Data
US 2016/0174536 A1 Jun. 23, 2016

(30) Foreign Application Priority Data

Dec. 19, 2014 (JP) ................................. 2014-257429

(51) Int. Cl.
*A01K 89/01* (2006.01)
*A01K 89/00* (2006.01)

(52) U.S. Cl.
CPC .................................. *A01K 89/00* (2013.01)

(58) Field of Classification Search
CPC .............. A01K 89/01; A01K 89/01083; A01K 89/01084; A01K 89/01087; A01K 89/01088
USPC ....................................................... 242/230
See application file for complete search history.

(56) References Cited

U.S. PATENT DOCUMENTS

| 4,426,045 A | * | 1/1984 | Gifford | A01K 89/01 242/232 |
| 4,527,752 A | * | 7/1985 | Maruyama | A01K 89/01 242/232 |
| 4,932,616 A | * | 6/1990 | McMickle | A01K 89/0108 242/233 |
| 5,601,244 A | * | 2/1997 | Kawabe | A01K 89/01 242/232 |
| 5,683,049 A | * | 11/1997 | Kawabe | A01K 89/0108 242/232 |
| 5,820,051 A | * | 10/1998 | Takeuchi | A01K 89/01 242/232 |
| 5,820,053 A | * | 10/1998 | Takeuchi | A01K 89/0108 242/231 |

(Continued)

FOREIGN PATENT DOCUMENTS

JP 2004313078 A * 11/2004 ............. A01K 89/01
JP 4221240 B2 11/2008

*Primary Examiner* — Emmanuel M Marcelo
(74) *Attorney, Agent, or Firm* — Global IP Counselors, LLP

(57) ABSTRACT

A switch member of a bail flip mechanism is fixed to a reel unit, and makes contact with a moving member located in a second position and moves the moving member toward a first position across a position corresponding to a dead center when a rotor is rotated in a winding direction. The switch member has a first and second slopes. The first slope forwardly slants at a first slant angle from a first end toward a position corresponding to a pivot position of a bail arm located across the dead center, along the winding direction of the rotor so as to be contactable to the moving member located in the second position. The second slope continues to the first slope and forwardly slants toward a second end located on the opposite side of the first end at a second slant angle larger than the first slant angle.

11 Claims, 12 Drawing Sheets

(56) References Cited

U.S. PATENT DOCUMENTS 6,382,542 B1 * 5/2002 Sato ........................ A01K 89/01
242/232

* cited by examiner

SPINNING REEL

CROSS-REFERENCE TO RELATED APPLICATIONS

This application claims priority to Japanese Patent Application No. 2014-257429 filed on Dec. 19, 2014, the entirety of which is hereby incorporated by reference.

BACKGROUND

Field of the Invention

The present invention relates to a spinning reel, particularly to a spinning reel equipped with a bail flip mechanism.

Background Information

A spinning reel is a type of reel for forwardly reeling out (casting) a fishing line. The spinning reel is equipped with a bail arm and a bail flip mechanism configured to return the bail arm to a fishing-line winding posture from a fishing-line releasing posture (see e.g., Japan Patent No. 4221240). A well-known bail flip mechanism includes a moving member, a toggle spring member and a switch member. The moving member is mounted to a rotor so as to be movable to a first position and a second position in a back-and-forth direction. The first position corresponds to the fishing-line winding position. The second position corresponds to the fishing-line casting position. The toggle spring member is configured to urge the moving member from the first position to the second position or vice versa across a dead center. When the rotor is rotated in the fishing-line winding direction, the switch member is configured to make contact with the moving member located in the second position and move the moving member toward the first position across a position corresponding to the dead center of the toggle spring member. The switch member is fixed to a circular flange of a reel unit. The switch member has a slope and a non-sloped surface. The slope gradually protrudes forward along the fishing-line winding direction of the rotor. The switch member protrudes across the dead center corresponding position to the vicinity of the middle between the first position and the dead center corresponding position. The switch member is thus constructed for forcibly moving the moving member toward the first position when either the moving member or the toggle spring member is not normally moved due to factors such as friction even if the dead center of the toggle spring member is exceeded.

In the well-known bail flip mechanism constructed as described above, the bail arm is flipped to the fishing-line casting position before releasing the fishing line. Accordingly, the moving member is moved from the first position to the second position. When releasing the fishing line is finished, the rotor is rotated in the fishing-line casting direction in conjunction with an operation of a handle. When the rotor is rotated in the fishing-line winding direction, the moving member located in the second position is pressed toward the first position by the slope until moved across the dead center corresponding position. When moved across the dead center corresponding position, the moving member is returned to the first position by the urging force of the toggle spring member, and thus, the bail arm is returned to the fishing-line winding posture.

In the well-known spinning reel, when the bail arm is returned from the fishing-line casting position to the fishing-line winding position, the toggle spring member is configured to be compressed until the moving member is moved onto the slope of the switch member and is moved across the dead center corresponding position. Thus, the urging force of the toggle spring member acutely increases. In the well-known spinning reel, rotating the handle against the urging force that acutely increases in flipping the bail is required. Put differently, when the moving member is moved onto the slope of the switch member, this makes it difficult to rotate the handle and further smoothly return the bail arm from the fishing-line casting position to the fishing-line winding position. As a countermeasure for this, reduction in gradient of the slope of the switch member can be proposed. However, the entire circumferential length of the switch member inevitably increases with reduction in gradient of the slope of the switch member.

SUMMARY

It is an object of the present invention to provide a spinning reel whereby a bail arm can be smoothly returned from a fishing-line casting position to a fishing-line winding position without, to the extent possible, increasing the entire length of a switch member.

A spinning reel according to the present invention is a spinning reel capable of casting a fishing line. The spinning reel includes a reel unit, a spool for winding the fishing line, a rotor, a bail arm and, a bail flip mechanism. The spool is mounted to the reel unit so as to be movable back and forth. The rotor is mounted to the reel unit so as to be rotatable at least in a fishing-line winding direction to wind the fishing line about the spool. The bail arm is mounted to the rotor so as to be pivotable between a fishing-line winding position and a fishing-line casting position. The fishing-line winding position enables the fishing line to be wound about the spool, whereas the fishing-line casting position enables the fishing line to be released from the spool. The bail flip mechanism is configured to return the bail arm from the fishing-line casting position to the fishing-line winding position in conjunction with rotation of the rotor in the fishing-line winding direction. The bail flip mechanism herein includes a moving member, a toggle spring member and a switch member. The moving member is mounted to the rotor so as to be movable back and forth between a first position and a second position in conjunction with the bail arm. The first position corresponds to the fishing-line winding position, whereas the second position corresponds to the fishing-line casting position. The moving member is located rearward of the first position when located in the second position. The toggle spring member is configured to urge the bail arm from the fishing-line winding position to the fishing-line casting position or vice versa across a dead center. The switch member is fixed to the reel unit, and is configured to make contact with the moving member located in the second position and move the moving member toward the first position when the rotor is rotated in the fishing-line winding direction. The switch member has a first end, a second end, a first slope and a second slope. The second end is disposed downstream of the first end in the fishing-line winding direction of the rotor. The first slope forwardly slants at a first slant angle along the fishing-line winding direction of the rotor so as to make contact with the moving member located in the second position and move the moving member across a position corresponding to the dead center. The second slope continues to the first slope and forwardly slants toward the second end at a second slant angle larger than the first slant angle.

In the present spinning reel, the switch member of the bail flip mechanism has the first slope that forwardly slants at the first slant angle and the second slope that forwardly slants at the second slant angle larger than the first slant angle. The first slope extends from the first end to a position located across the dead center corresponding position of the moving member. The second slope continues to the first slope, and extends toward the second end from the position located across the dead center corresponding position of the moving member. The toggle spring member is herein configured to be compressed by the first slope slanting at the first slant angle smaller than the second slant angle of the second slope until the dead center is reached, and is configured to be extended when the dead center is exceeded. Additionally, when the dead center is exceeded, the toggle spring member is configured to urge the bail arm toward the fishing-line winding position, and the moving member is returned to the first position. It should be noted that even when either the moving member or the toggle spring member is not normally actuated due to factors such as friction after the dead center is exceeded, the second slope is capable of moving the moving member toward the first position. Thus, the urging force of the toggle spring member increases at a small rate until the dead center is reached, and the bail arm can be smoothly returned from the fishing-line casting position to the fishing-line winding position. Additionally, the second slant angle of the second slope is larger than the first slant angle, and hence, an increase in the entire length of the switch member can be prohibited.

The second slant angle may gradually increase relative to the first slant angle. According to the construction, the moving member can be moved more smoothly.

The switch member may further have a non-sloped surface extending from the second slope toward the second end. According to this configuration, the moving member can be held in the first position by the non-sloped surface.

The switch member may further have a perpendicular surface that is disposed on a second-end side of the non-sloped surface so as to be perpendicular to the non-sloped surface. According to this configuration, the switch member can be simply constructed in a spinning reel in which a rotor is constantly prevented from reversely rotating in the fishing-line casting direction by a one-way clutch.

The switch member may further have a third slope backwardly slanting from the non-sloped surface toward the second end along the fishing-line winding direction of the rotor. According to this configuration, in a spinning reel in which a one-way clutch can be switched between a reverse rotation prevented state and a reverse rotation enabled state, the bail arm can be returned to the fishing-line winding position even when the rotor is rotated in either of the fishing-line winding direction and the fishing-line casting direction in a condition that the bail arm takes the fishing-line casting position.

The reel unit may include a chassis and a lid member. The chassis has a mechanism accommodation space and a first flange part disposed forward of the mechanism accommodation space. The lid member has a second flange part forming a circular flange together with the first flange part, and is fixed to the chassis so as to cover the mechanism accommodation space. Furthermore, the switch member may have a fixation part. The fixation part is fixed to the flange so as to be interposed between the first flange part and the second flange part. According to the construction, the switch member can be fixed to the flange only by fixing the lid member to the chassis without separately providing a fixation member.

Overall, according to the present invention, the bail arm can be smoothly returned to the fishing-line winding position from the fishing-line casting position without, to the extent possible, increasing the entire length of the switch member.

BRIEF DESCRIPTION OF THE DRAWINGS

Referring now to the attached drawings which form a part of this original disclosure.

DETAILED DESCRIPTION OF EMBODIMENTS

Schematic Construction of Spinning Reel

A spinning reel 10 employing a preferred embodiment of the present invention is capable of forwardly reeling out (casting) a fishing line. It should be noted that in the following explanation, "front" indicates a direction of reeling out the fishing line, and specifically, indicates the left side in FIGS. 1 and 2.

Figure 1:
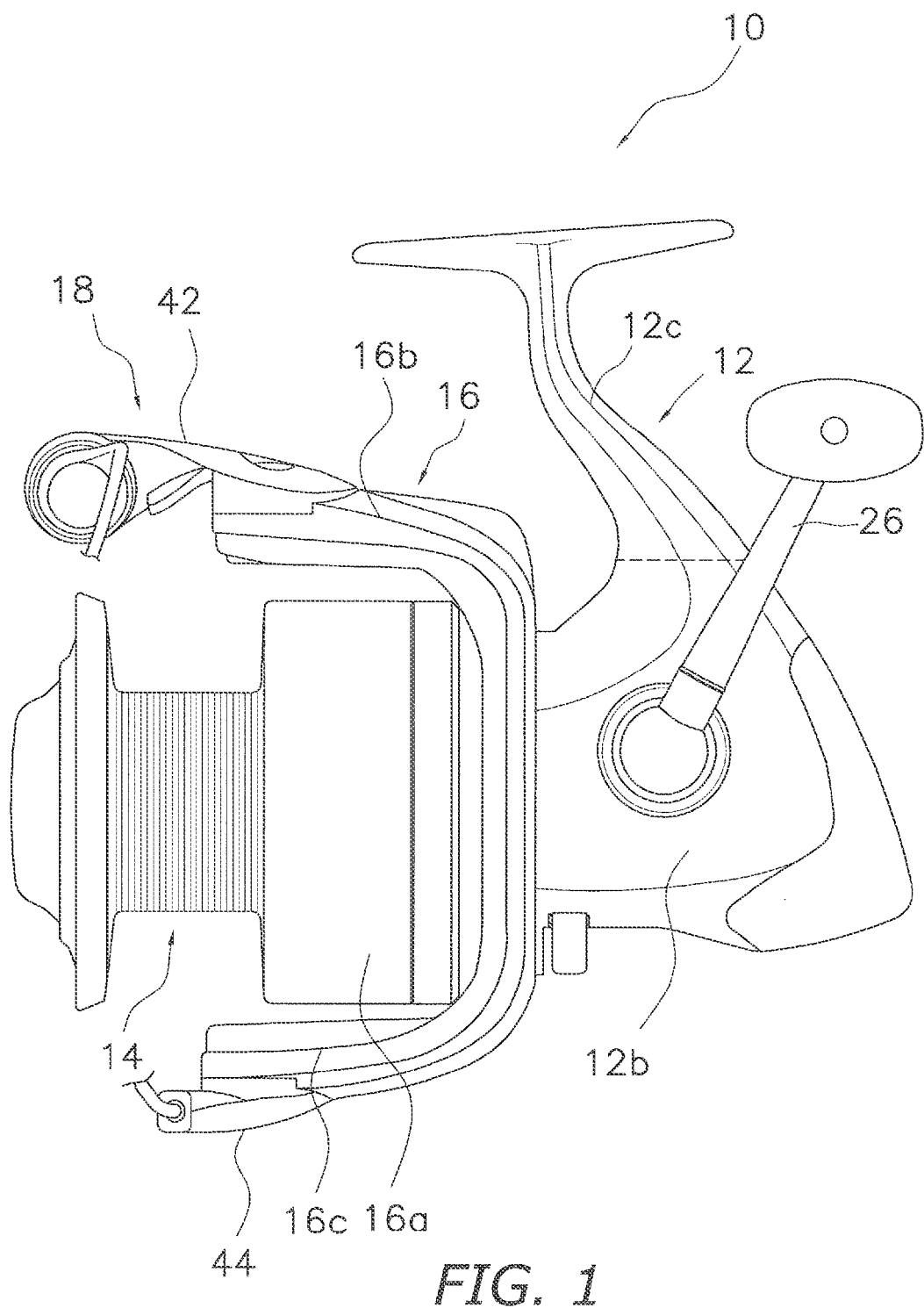
FIG. 1 is a side view of a spinning reel according to a preferred embodiment of the present invention.
Figure 2:
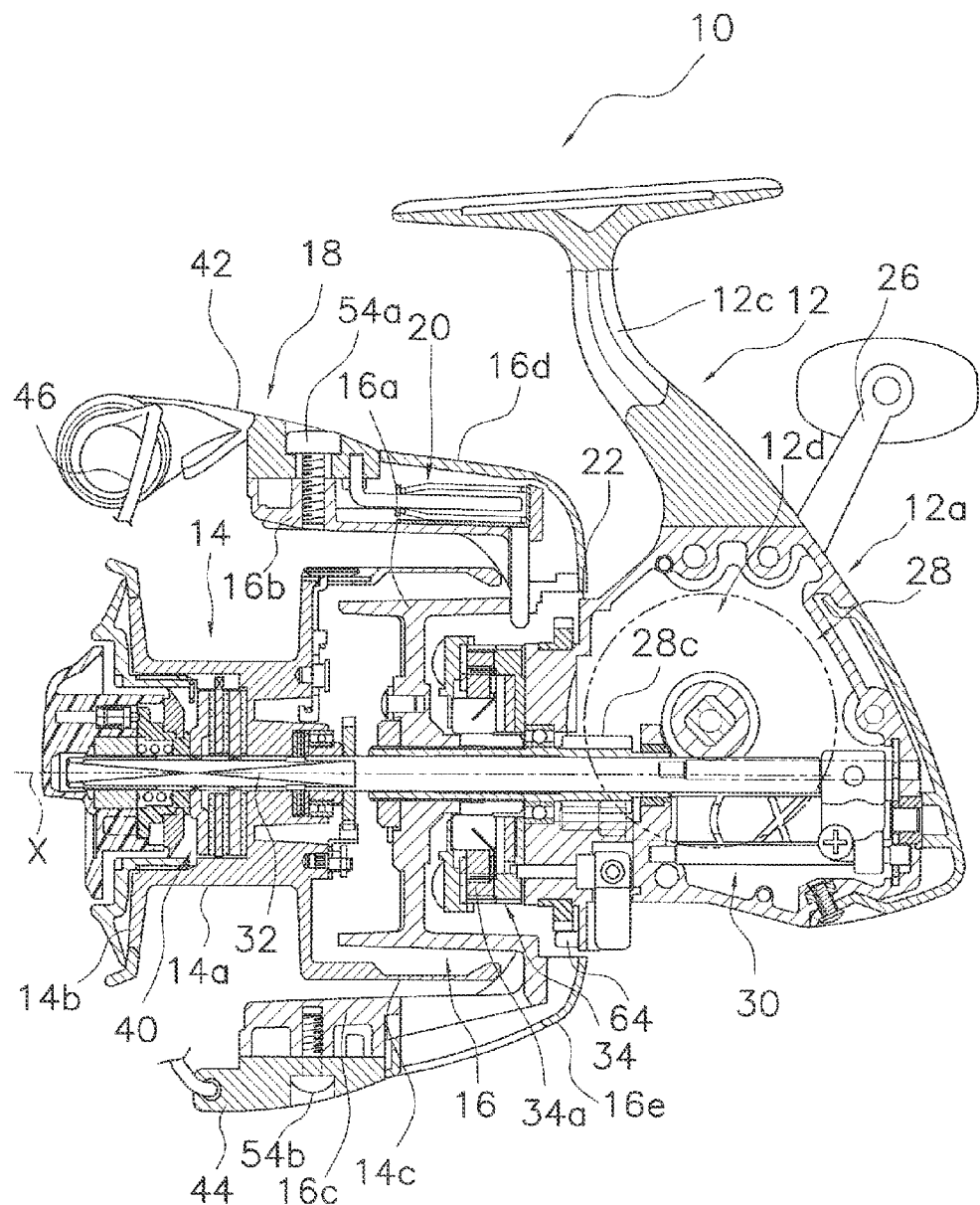
FIG. 2 is a cross-sectional side view of the spinning reel.

As shown in FIGS. 1 and 2, the spinning reel 10 includes a reel unit 12, a spool 14, a rotor 16, a bail arm 18 and a bail flip mechanism 20 (see FIG. 2). The spool 14 is a member for winding the fishing line and is mounted to the reel unit 12 so as to be movable back and forth. The rotor 16 winds the fishing line onto the spool 14. The rotor 16 is configured to be rotated about an axis X arranged along a back-and-forth direction. The rotor 16 is mounted to the reel unit 12 so as to be rotatable at least in a fishing-line winding direction. The bail arm 18 is mounted to the rotor 16 so as to be pivotable between a fishing-line winding position and a fishing-line casting position. The fishing-line winding position enables the fishing line to be wound onto the spool 14, whereas the fishing-line casting position enables the fishing line to be reeled out from the spool 4. The bail flip mechanism 20 is configured to return the bail arm 18 from the fishing-line casting position to the fishing-line winding position in conjunction with rotation of the rotor 16 in the fishing-line winding direction.

Reel Unit

Figure 3:
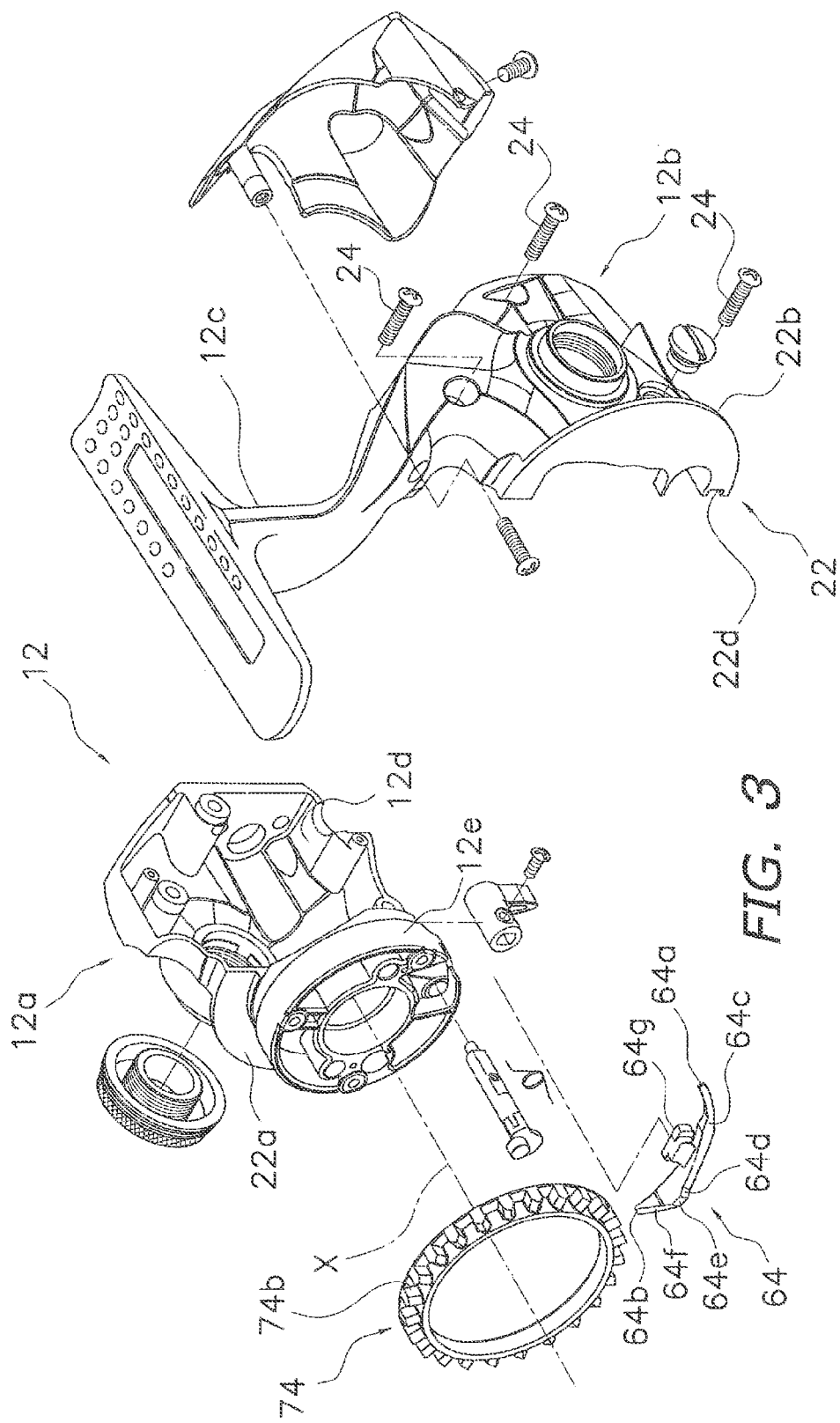
FIG. 3 is an exploded perspective view of a reel unit of the spinning reel.

As shown in FIG. 3, the reel unit 12 includes a chassis 12a, a lid member 12b and a fishing rod attachment leg 12c. The chassis 12a has a mechanism accommodation space 12d and a first flange part 22a located forward of the mechanism accommodation space 12d. In the present preferred embodiment, the first flange part 22a has a semicircular shape. A tubular part 12e is formed on the front side of the first flange part 22a. The tubular part 12e has a diameter smaller than that of the first flange part 22a and protrudes in a forward direction. The tubular part 12e is disposed coaxially to the first flange part 22a. A flange 22 (to be described) is disposed in parallel to a rotational plane of the rotor 16.

The lid member 12b has a second flange part 22b. The second flange part 22b has a semicircular shape and composes the flange 22 having a circular shape together with the first flange part 22a. The lid member 12b is fixed to the chassis 12a so as to cover the mechanism accommodation space 12d. The lid member 12b is detachably fixed to the chassis 12a by a plurality of (e.g., three) fixation bolts 24. The fishing rod attachment leg 12c is a roughly T-shaped member formed on either the chassis 12a or the lid member 12b, and enables a fishing rod to be attached thereto. In the present preferred embodiment, the fishing rod attachment leg 12c is integrated with the lid member 12b. Alternatively, the fishing rod attachment leg 12c may be integrated with the chassis 12a. As shown in FIGS. 1 and 2, a handle 26 is rotatably mounted to the reel unit 12. The handle 26 is mounted to either the chassis 12a or the lid member 12b. FIG. 1 shows an exemplary (left handled) construction that the handle 26 is mounted to the lid member 12b. By contrast, FIG. 2 shows an exemplary (right handled) construction that the handle 26 is mounted to the chassis 12a.

Rotor

As shown in FIG. 2, the rotor 16 has a coupling part 16a, a first rotor arm 16b and a second rotor arm 16c. The coupling part 16a has a tubular shape and is coupled to a pinion gear 28c so as to be unitarily rotatable therewith. The first rotor arm 16b and the second rotor arm 16c are integrated with the coupling part 16a. Additionally; the rotor 16 has a first cover member 16d and a second cover member 16e. The first cover member 16d covers the radially outer surface of the first rotor arm 16b, whereas the second cover member 16e covers the radially outer surface of the second rotor arm 16c. The first rotor arm 16b forwardly extends from one of the opposed positions on the rear end of the coupling part 16a at an interval from the coupling part 16a. Likewise, the second rotor arm 16c forwardly extends from the other of the opposed positions on the rear end of the coupling part 16a at an interval from the coupling part 16a. The rotor 16 is prevented from rotating (reversely) in a fishing-line casting direction by an anti-reverse rotation mechanism 34 disposed between the reel unit 12 and the rotor 16. It should be noted that in the present preferred embodiment, the anti-reverse rotation mechanism 34 is capable of switching the rotor 16 between a reverse rotation prevented state and a reverse rotation enabled state. The rotor 16 is prevented from (reversely) rotating in the fishing-line releasing direction in the reverse rotation prevented state, and is capable of reversely rotating in the reverse rotation enabled state.

Bail Arm

Figure 4:
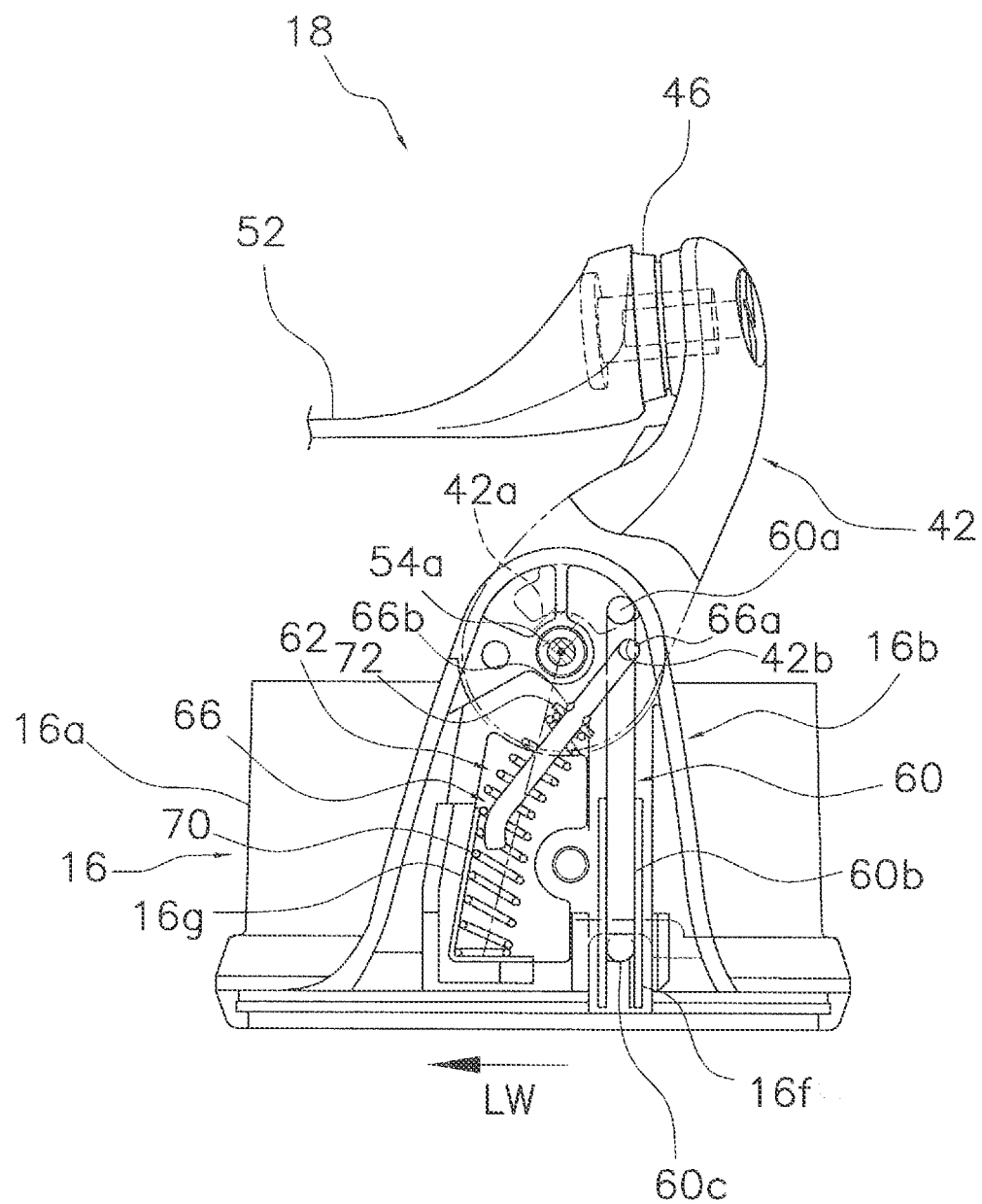
FIG. 4 is a side view of a first rotor arm that includes a bail arm taking a fishing-line winding position.
Figure 9:
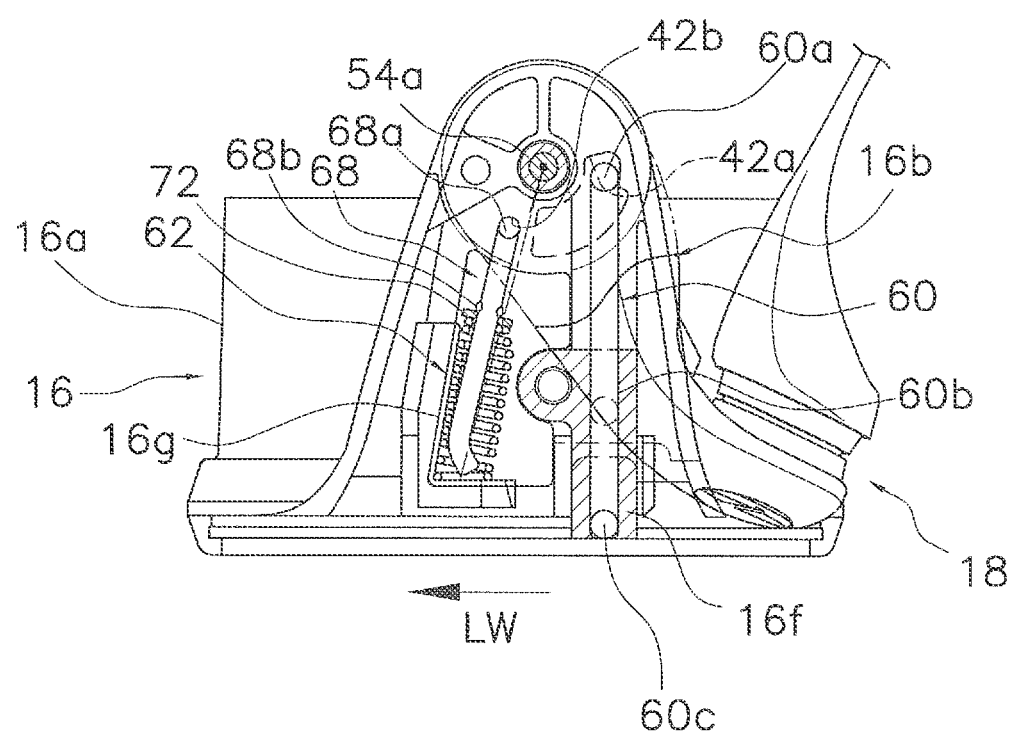
FIG. 9 is a side view of the first rotor arm that includes the bail arm taking a fishing-line casting position.

As shown in FIGS. 2 and 4, the bail arm 18 is mounted to the forwardly extended tip of the first rotor arm 16b and that of the second rotor arm 16c so as to be pivotable between the fishing-line winding position (see FIG. 4) and the fishing-line casting position (FIG. 9). The bail arm 18 includes a first bail support member 42, a second bail support member 44 and a bail 46 coupling the first bail support member 42 and the second bail support member 44. The first bail support member 42 is pivotably mounted to the outer peripheral side of the tip of the first rotor arm 16b. The second bail support member 44 is mounted to the outer peripheral side of the tip of the second rotor arm 16c. The first bail support member 42 is pivotably attached to the first rotor arm 16b by a first attachment pin 54a screwed into the tip of the first rotor arm 16b. The second bail support member 44 is pivotably attached to the second rotor arm 16c by a second attachment pin 54b screwed into the tip of the second rotor arm 16c.

Bail Flip Mechanism

As shown in FIG. 2, the bail flip mechanism 20 is disposed inside the first rotor arm 16b. The bail flip mechanism 20 returns the bail arm 18 from the fishing-line casting position to the fishing-line winding position in conjunction with rotation of the rotor 16 and for maintaining the bail arm 18 in each of the postures.

Figure 5:
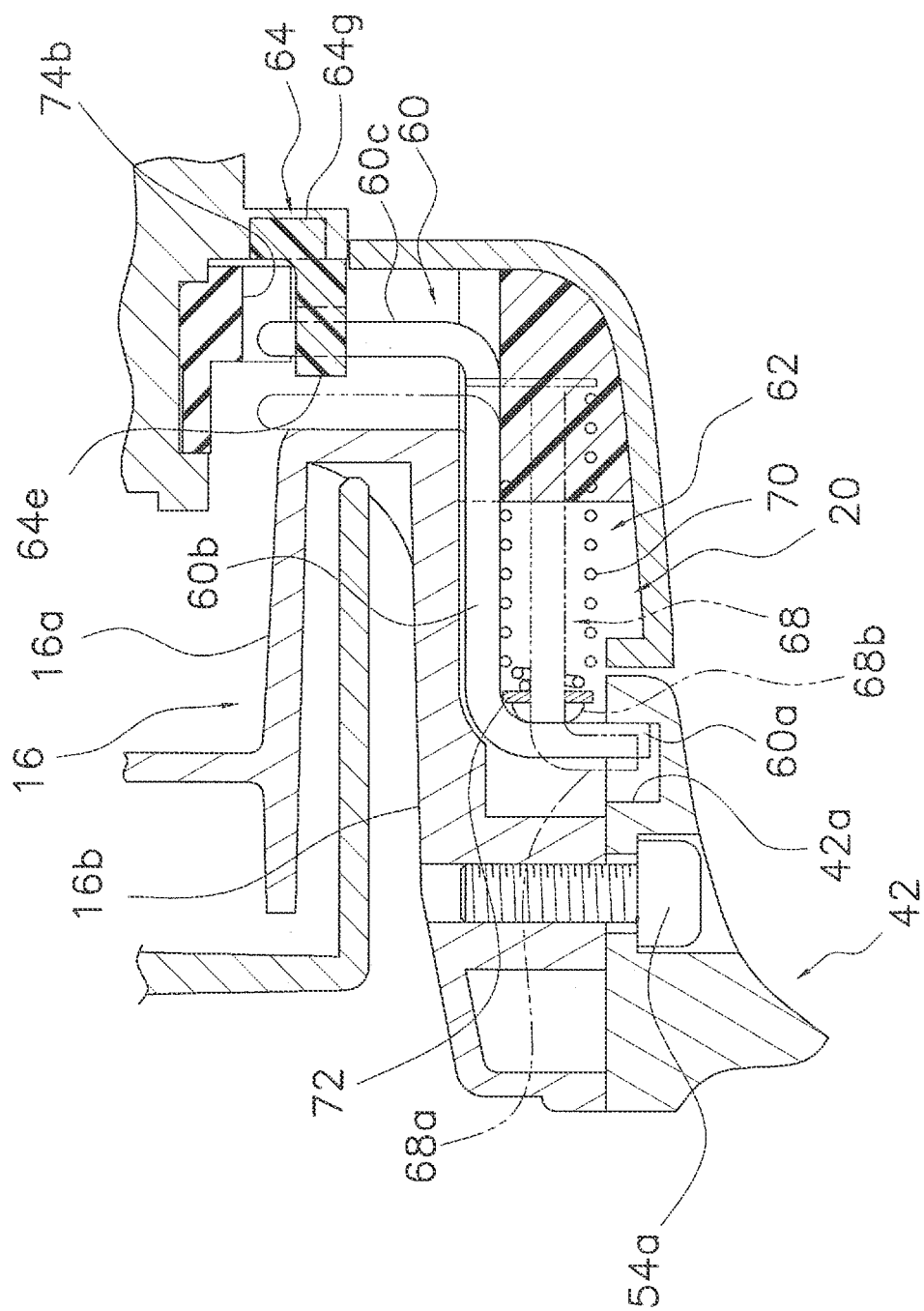
FIG. 5 is a partial cross-sectional view of the first rotor arm.
Figure 6:
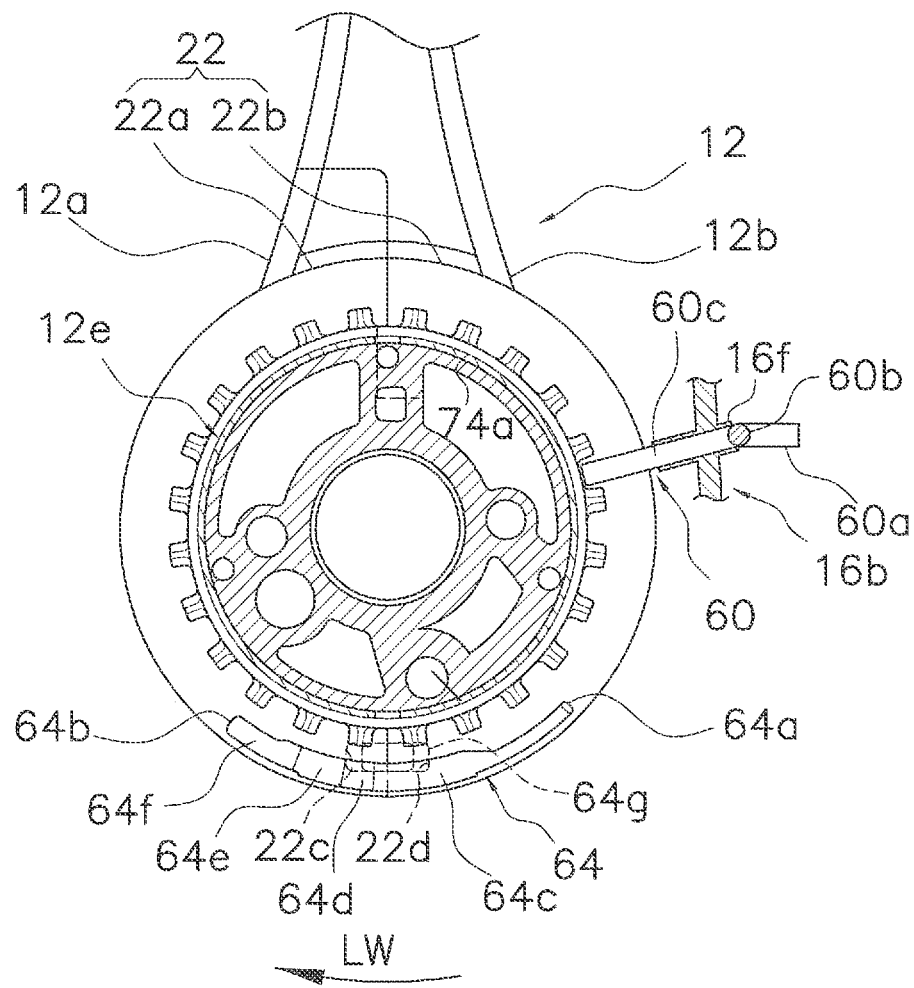
FIG. 6 is a partial front view of the reel unit.
Figure 7:
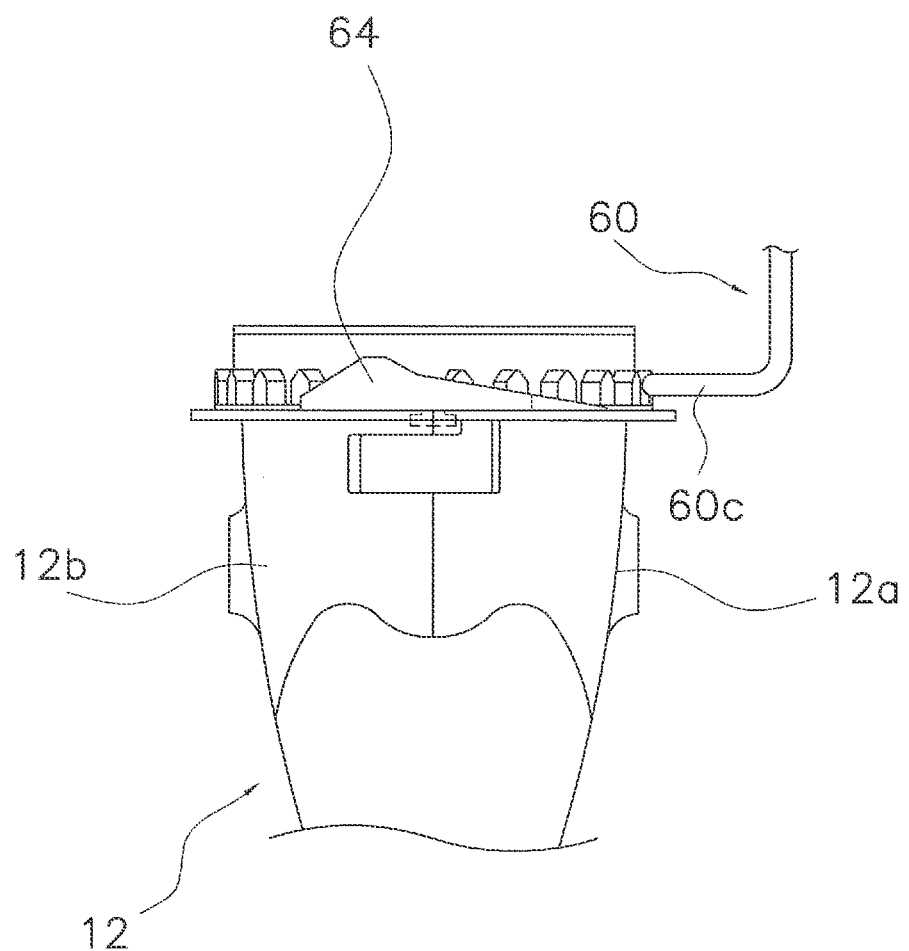
FIG. 7 is a partial bottom view of the reel unit.
Figure 8:
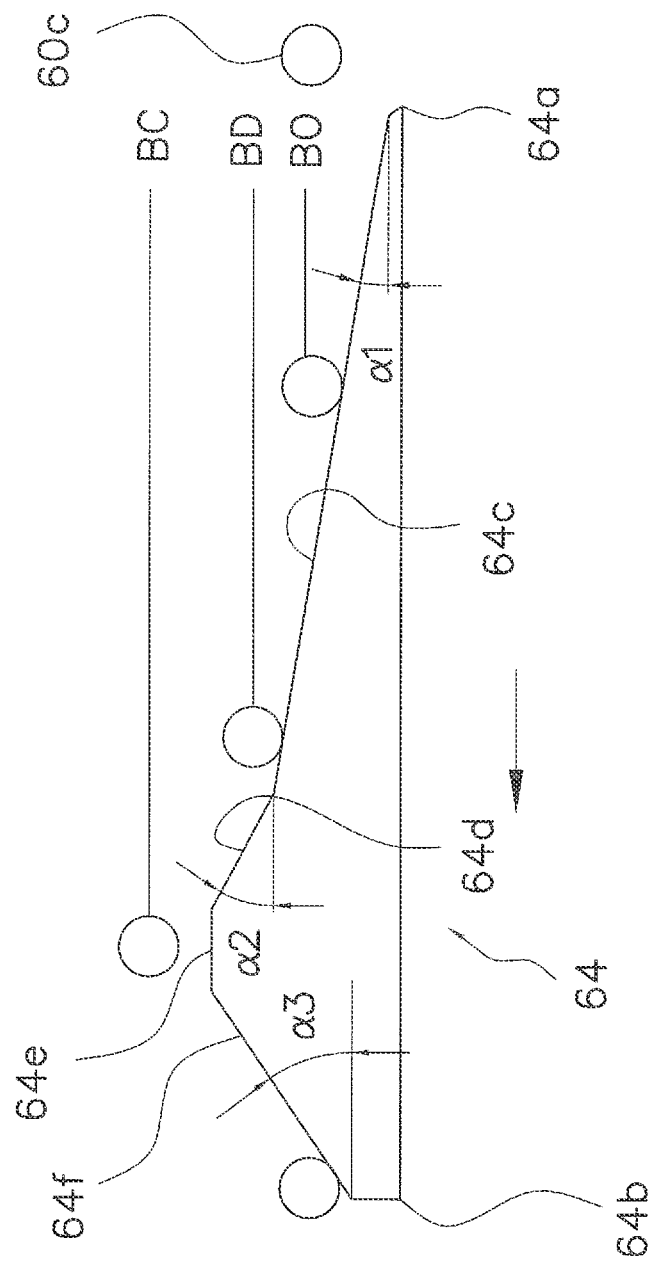
FIG. 8 is schematic side view of a switch member that the curving slope thereof is linearly illustrated.

As shown in FIGS. 4 and 5, the bail flip mechanism 20 includes a moving member 60, a toggle spring member 62 and a switch member 64. For example, the moving member 60 is a member formed by bending the both ends of a wire rod made of metal such as stainless alloy at 90 degrees in different directions. The moving member 60 is mounted to the first rotor arm 16b so as to be movable roughly back and forth between a first position shown in FIG. 4 and a second position shown in FIG. 9 retracted from the first position. As shown in FIG. 5, a tip end 60a of the moving member 60 is bent radially outward, and is locked to a locking grooved recess 42a (see FIG. 4). The locking grooved recess 42a has a roughly sector shape, and is formed on a surface of the first bail support member 42 in opposition to the first rotor arm 16b. An intermediate part 60b of the moving member 60 is disposed radially inward of the toggle spring member 62, extends in the back-and-forth direction, and is guided in the back-and-forth direction by a guide part 16f mounted to the first rotor arm 16b. The intermediate part 60b is configured to be guided back and forth in conjunction with pivoting of the bail arm 18. The intermediate part 60b and a rear end 60c of the moving member 60 are guided from both sides thereof in the back-and-forth direction and the radial direction by the guide part 16f mounted to the interior of the first rotor arm 16b. The rear end 60c is bent radially inward, and is configured to be contactable to the switch member 64 when the moving member 60 is located in the second position. The rear end 60c is bent toward the rotational center of the rotor 16.

Figure 10:
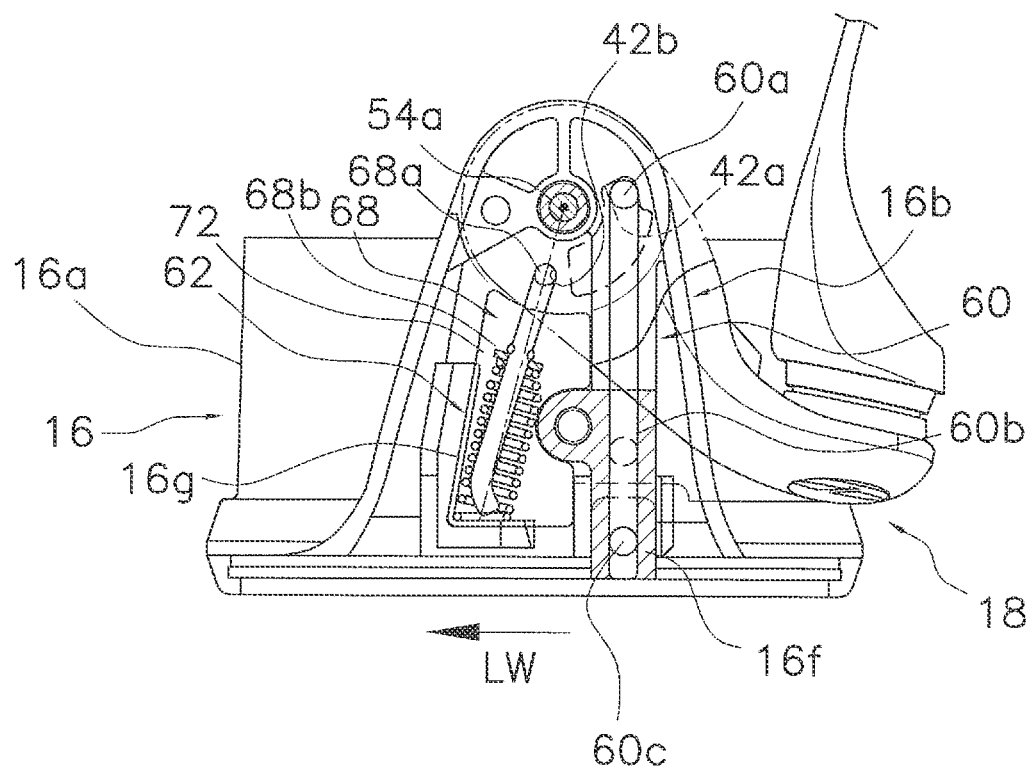
FIG. 10 is a side view of the first rotor arm where a toggle spring member is set in a dead center.

The toggle spring member 62 is a member for urging the bail arm 18 from the fishing-line winding position to the fishing-line casting position or vice versa across a dead center and for maintaining the bail arm 18 in the fishing-line casting position or the fishing-line winding position. The toggle spring member 62 includes a rod 68 and a coil spring 70. One end of the rod 68 is hooked to the first bail support member 42, whereas the other end of the rod 68 extends along the first rotor arm 16b. The coil spring 70 urges the rod 68 to its protruding side. Additionally, the rod 68 has a hook part 68a on the tip thereof. The hook part 68a is bent toward the first bail support member 42 so as to be hooked to a hook hole 42b of the first bail support member 42. Moreover, the rod 68 has stopper protrusions 68b on the intermediate part thereof in order to hold the tip of the coil spring 70. A washer 72 is mounted to the stopper protrusions 68b, and the tip end of the coil spring 70 is contacted to the washer 72. Thus, force is evenly transferred from the tip of the coil spring 70 to the rod 68. The cod spring 70 is restricted from moving in the fishing-line winding direction (LW) within the first rotor arm 16b by a restriction wall 16g mounted to the outer lateral surface of the first rotor arm 16b. The coil spring 70 is compressed the most when the toggle spring member 62 is set in the dead center as shown in FIG. 10.

As shown in FIG. 3 and FIGS. 5 to 8, the switch member 64 is fixed to the reel unit 12. The switch member 64 is a member made of synthetic resin such as polyacetal and exerts good sliding performance and good sound insulation performance. The respective parts of the switch member 64 are integrally formed with a mold. The switch member 64 makes contact with the moving member 60 located in the second position and then moves the moving member 60 toward the first position across a position corresponding to the dead center of the toggle spring member 62 when the rotor 16 is rotated in the fishing-line winding direction. The switch member 64 has a first end 64*a*, a second end 64*b*, a first slope 64*c*, a second slope 64*d*, a non-sloped surface 64*e*, a third slope 64*f* and a fixation part 64*g*.

The second end 64*b* is disposed downstream of the first end 64*a* in the fishing-line winding direction of the rotor 16. The first slope 64*c* is disposed so as to slant with respect to the rotational plane of the rotor 16. The first slope 64*c* forwardly slants at a first slant angle α1 along the fishing-line winding direction so as to make contact with the moving member 60 located in the second position (BO) and then move the moving member 60 to a position located across the position (BD) corresponding to the dead center of the toggle spring member 62. When the moving member 60 is moved to the position located across the dead center corresponding position (BD), the bail arm 18 is normally returned to the fishing-line winding position by the urging force of the toggle spring member 62, and the moving member 60 is returned to the first position (BC). Accordingly; the fishing line is wound about the spool 14 through the bail arm 18.

The second slope 64*d* extends continuously from the first slope 64*c* toward the second end 64*b*. The second slope 64*d* forwardly slants at a second slant angle α2 larger than the first slant angle α1 along the fishing-line winding direction. The non-sloped surface 64*e* is disposed in parallel to the rotational plane of the rotor 16, and extends from the second slope 64*d* toward the second end 64*b* roughly in parallel to the flange 22. The third slope 64*f* backwardly slants from the non-sloped surface 64*e* toward the second end 64*b* along the fishing-line winding direction of the rotor 16. The third slope 64*f* prevents deformation of the moving member 60 even if the moving member 60 makes contact with the switch member 64 when the rotor 16 is reversely rotated while the bail arm 18 takes the fishing-line casting position and simultaneously the anti-reverse rotation mechanism 34 is set in the reverse rotation enabled state. The fixation part 64*g* is engaged with a first recess 22*c* (see FIG. 6) recessed on the first flange part 22*a* and a second recess 22*d* (see FIGS. 3 and 6) recessed on the second flange part 22*b*, and is thus retained by the first and second recesses 22*c* and 22*d* while being interposed and held therebetween. Therefore, no member is herein required for fixing the switch member 64.

In the bail flip mechanism 20, the switch member 64 for returning the moving member 60 from the second position to the first position has the first slope 64*c* with the first slant angle α1 designed to be small and the second slope 64*d* with the second slant angle α2 larger than the first slant angle α1. With the construction, even when either the moving member 60 or the toggle spring member 62 is not normally actuated due to factors such as friction after the dead center is exceeded, the second slope 64*d* can move the moving member 60 toward the first position at the position located across the dead center corresponding position. Therefore, the urging force of the toggle spring member 62 increases at a small rate until the dead center is reached, and the bail arm 18 can be smoothly returned from the fishing-line casting position to the fishing-line winding position. Additionally, the second slant angle α2 of the second slope 64*d* is large, and thus, an increase in entire length of the switch member 64 can be prohibited.

Moreover, when the rotor 16 is rotated in the fishing-line winding direction by operating the handle 26 in the condition that the moving member 60 is located in the second position, the rear end 60*c* of the moving member 60 makes contact with the first slope 64*c* of the switch member 64. Accordingly, the moving member 60 is forwardly pressed toward the first position, and then, the bail arm 18 is returned to the fishing-line winding position at a point of time when the dead center of the toggle spring member 62 is exceeded (see FIG. 10).

Operation and Action of Reel

In casting, reverse rotation of the rotor 16 is prevented by the anti-reverse rotation mechanism 34, and the bail arm 18 is flipped from the fishing-line winding position shown in FIG. 4 to the fishing-line casting position shown in FIG. 9, with the bail arm 18 being held by the hand of an angler. When the bail arm 18 is flipped to the fishing-line casting position, the first bail support member 42 and the second bail support member 44 are flipped rearward, and the moving member 60 is disposed in the second position. In the condition that the bail arm 18 is flipped down to the fishing-line casting position, the fishing line can be easily released from the spool 14.

In pivoting the bail arm 18 from the fishing-line winding position to the fishing-line casting position, the rod 68 of the toggle spring member 62 gradually retracts and simultaneously pivots in the counterclockwise direction in conjunction with rotation of the first bail support member 42. At this time, the rod 68 retracts until the dead center shown in FIG. 10 is exceeded. When the bail arm 18 pivots across the dead center toward the fishing-line casting position, the rod 68 is caused to protrude by the urging force of the coil spring 70, switches the bail arm 18 into the fishing-line casting position, and also holds the bail arm 18 in the switched posture.

When the bail arm 18 finishes pivoting to the fishing-line casting position, the rear end 60*c* of the moving member 60 is engaged with an engaging part 74*b* of a brake member 74 in conjunction with the pivot.

After casting, when the handle 26 is rotated in the fishing-line winding direction with the bail arm 18 kept in the fishing-line casting position, the rotor 16 is rotated in the fishing-line winding direction LW (arrowed direction in FIGS. 4 and 6) by a rotor drive mechanism 28. When the rotor 16 is thus rotated in the fishing-line winding direction LW, the bail arm 18 is returned to the fishing-line winding position by the bail flip mechanism 20. At this time, as described above, the first slant angle α1 of the first slope 64*c* of the switch member 64 mounted to the front surface of the flange 22 is set to be small, and hence, the spring force of the toggle spring member 62 increases at a low rate. Hence, the bail arm 18 can be returned to the fishing-line winding position with a small force. Consequently, the bail arm 18 can be smoothly returned from the fishing-line casting position to the fishing-line winding position.

Additionally, the second slope 64*d* is formed on the switch member 64. Hence, even when either the moving member 60 or the toggle spring member 62 is not normally actuated due to factors such as friction after the dead center is exceeded, the moving member 60 can be forcibly moved toward the first position by the second slope 64*d*. Thus, even when such a phenomenon occurs, the bail arm 18 can be reliably returned to the fishing-line winding position. Moreover, the second slant angle α2 of the second slope 64*d* is set to be large. Hence, it is possible to inhibit increase in entire length of the switch member 64 from the first end 64a to the second end 64b.

Other Preferred Embodiments

One preferred embodiment of the present invention has been described above. However, the present invention is not limited to the aforementioned preferred embodiment, and a variety of changes can be made without departing from the scope of the present invention. Especially, a plurality of preferred embodiments and modifications described in the present specification can be arbitrarily combined on an as-needed basis.

Figure 11:
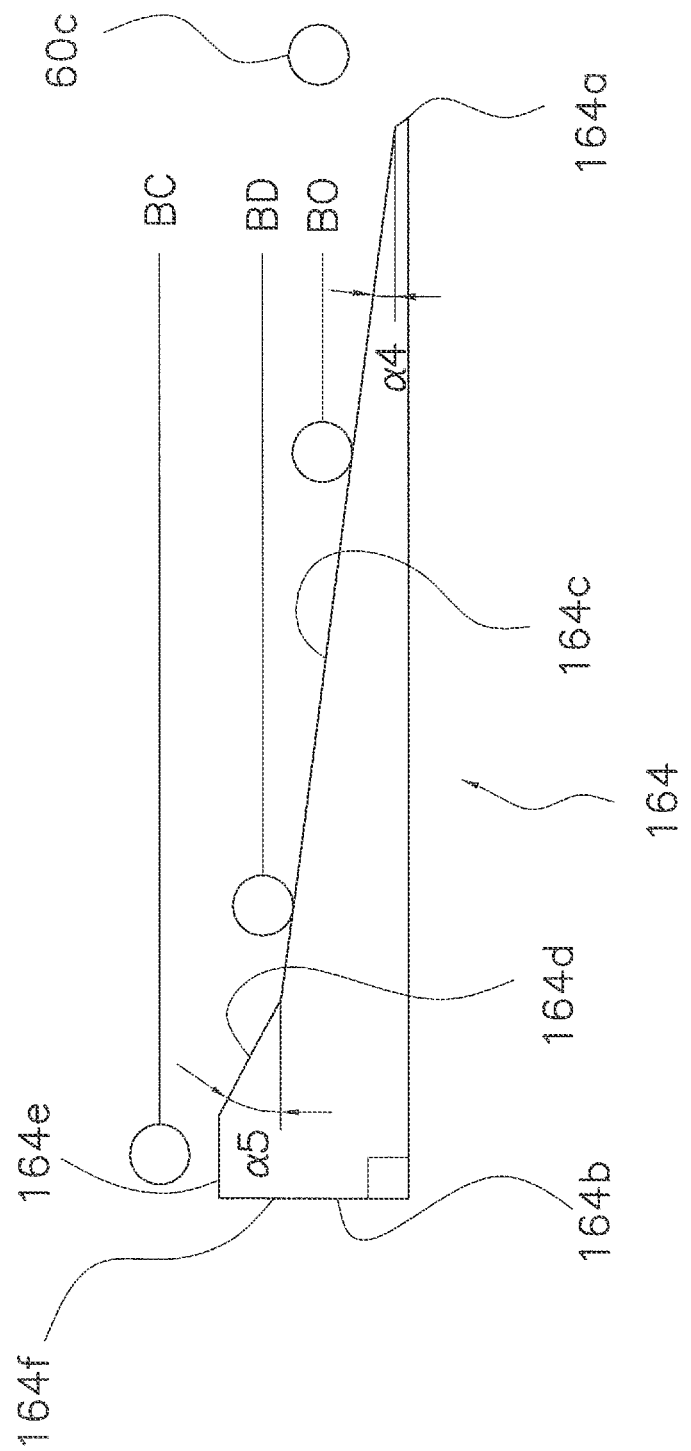
FIG. 11 is a diagram corresponding to FIG. 8 according to another preferred embodiment.

(a) In the aforementioned preferred embodiment, the rotor 16 is configured to be rotatable in both of the fishing-line winding direction and the fishing-line releasing direction. However, the rotor 16 may be configured to be rotatable only in the fishing-line winding direction. In this case, the anti-reverse rotation mechanism 34 is configured to constantly prevent the rotor 16 from rotating in the fishing-line releasing direction. As shown in FIG. 11, a switch member 164 herein has a first end 164a, a second end 164b, a first slope 164c, a second slope 164d and a non-sloped surface 164e. The second end 164b of the switch member 164 has a perpendicular surface 164f instead of the third slope 64f. The perpendicular surface 164f is arranged perpendicularly to the non-sloped surface 164e. The construction is based on the fact that the rotor 16 is herein non-rotatable reversely in the fishing-line releasing direction, and hence, the moving member 60 is not contacted to the switch member 164 from the second end 164b side. Next, the first slope 164c forwardly slants at a first slant angle $\alpha 4$. The second slope 164d forwardly slants at a second slant angle $\alpha 5$. When the entire length of the switch member 164 is set to be equal to that of the switch member 64 in the aforementioned preferred embodiment, the switch member 164 does not have the third slope 64f of the switch member 64, and thus, the first slant angle $\alpha 4$ is set to be smaller than the first slant angle $\alpha 1$ by that much. Consequently, the bail arm 18 can be further smoothly returned from the fishing-line casting position to the fishing-line winding position.

Figure 12:
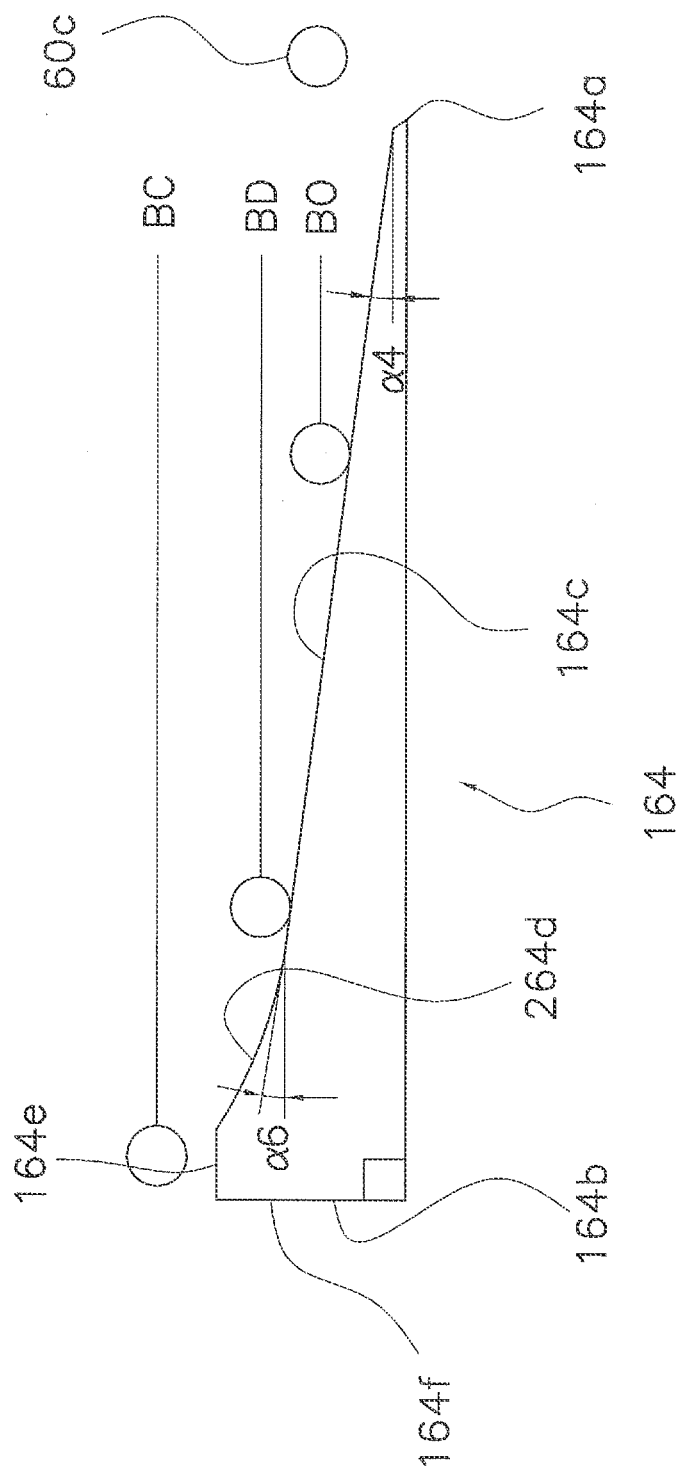
FIG. 12 is a diagram corresponding to FIG. 8 according to yet another preferred embodiment.

(b) As shown in FIG. 12, a second slant angle $\alpha 6$ of a second slope 264d may gradually increase relative to the first slant angle $\alpha 4$. In FIG. 12, for instance, the second slant angle $\alpha 6$ gradually gets larger than the first slant angle $\alpha 4$ toward the second end 164f. Thus, the second slope 264d has a curved shape (e.g., a circular-arc shape) such that the slant angle thereof smoothly varies. Due to this, the moving member 60 is further smoothly moved.

(c) In the aforementioned preferred embodiment, the present invention has been explained by exemplifying a front drag type spinning reel 10. However, the spinning reel of the present invention is not limited to a front drag type. For example, the present invention is applicable to all types of spinning reels equipped with the bail flip mechanism, including a spinning reel of a rear drag type, a spinning reel of a lever brake type capable of braking the rotor with a lever member, and so forth.

Features

The aforementioned preferred embodiments can be expressed as follows.

(A) The spinning reel 10 is a type of spinning reel capable of forwardly releasing (casting) a fishing line. The spinning reel 10 includes the reel unit 12, the spool 14 for winding the fishing line, the rotor 16, the bail arm 18 and the bail flip mechanism 20. The spool 14 is mounted to the reel unit 12 so as to be movable back and forth. The rotor 16 is mounted to the reel unit 12 so as to be rotatable at least in the fishing-line winding direction in order to wind the fishing line about the spool 14. The bail arm 18 is mounted to the rotor 16 so as to be pivotable between the fishing-line winding position and the fishing-line casting position. The fishing-line winding position enables the fishing line to be wound about the spool 14, whereas the fishing-line casting position enables the fishing line to be released from the spool 14. The bail flip mechanism 20 is configured to return the bail arm 18 from the fishing-line casting position to the fishing-line winding position in conjunction with rotation of the rotor 16 in the fishing-line winding direction. The bail flip mechanism 20 includes the moving member 60, the toggle spring member 62 and the switch member 64. The moving member 60 is mounted to the rotor 16 so as to be movable back and firth between the first position BC and the second position BO in conjunction with the bail arm 18. The first position BC corresponds to the fishing-line winding position, whereas the second position BO corresponds to the fishing-line casting position. The moving member 60 is located rearward of the first position when being located in the second position. The toggle spring member 62 is configured to urge the bail arm 18 from the fishing-line winding position to the fishing-line casting position or vice versa across the dead center. The switch member 64 is fixed to the reel unit 12, and is configured to make contact with the moving member 60 located in the second position and move the moving member 60 toward the first position BC across the dead center corresponding position BD when the rotor is rotated in the fishing-line winding direction. The switch member 64 has the first slope 64c and the second slope 64d. The first slope 64c forwardly slants at the first slant angle $\alpha 1$ from the first end 64a toward a position corresponding to a pivot position of the bail arm 18 located across the dead center along the fishing-line winding direction of the rotor 16 so as to be contactable to the moving member 60 located in the second position BO. The second slope 64d continues to the first slope 64c and forwardly slants toward the second end 64b located on the opposite side of the first end 64a at the second slant angle $\alpha 2$ larger than the first slant angle $\alpha 1$.

In the spinning reel 10, the switch member 64 of the bail flip mechanism 20 has the first slope 64c that forwardly slants at the first slant angle $\alpha 1$ and the second slope 64d that forwardly slants at the second slant angle $\alpha 2$ larger than the first slant angle $\alpha 1$. The first slope 64c extends from the first end 64a to a position across the dead center corresponding position BD. The second slope 64d continues to the first slope 64c, and extends toward the second end 64b. The toggle spring member 62 is herein configured to be compressed by the first slope 64c slanting at the first slant angle $\alpha 1$ smaller than the second slant angle $\alpha 2$ until the dead center is reached. Additionally, when the dead center is exceeded, the toggle spring member 62 is configured to urge the bail arm 18 toward the fishing-line winding position, and the moving member 60 is returned to the first position BC. Thus, the urging force of the toggle spring member 62 increases at a small rate until the dead center is exceeded, and the bail arm 18 can be smoothly returned to the fishing-line winding position.

(B) The second slant angle $\alpha 6$ may gradually increase relative to the first slant angle $\alpha 4$. According to the construction, the moving member 60 can be more smoothly moved.

(C) The switch member 64 may further have the non-sloped surface 64e extending from the second slope 64d toward the second end 64e. According to the construction, the moving member 60 can be held in the first position by the non-sloped surface 64e.

(D) The switch member 164 may further have the perpendicular surface 164f that is disposed on the second-end 164b side of the non-sloped surface 164e so as to be perpendicular to the non-sloped surface 164f. According to the construction, the switch member 164 can be simply constructed in a type of spinning reel that the rotor 16 is constantly prevented from reversely rotating in the fishing-line casting direction by a one way clutch 34a.

(E) The switch member 64 may further have the third slope 64f backwardly slanting from the non-sloped surface 64e toward the second end 64b along the fishing-line winding direction of the rotor 16. According to the construction, in the spinning reel 10 that the one-way clutch 34a can be switched between the reverse rotation prevented state and the reverse rotation enabled state, the bail arm 18 can be returned to the fishing-line winding position even when the rotor 16 is rotated in either of the fishing-line winding direction and the fishing-line casting direction in the condition that the bail arm 18 takes the fishing-line casting position.

(F) The reel unit 12 may include the chassis 12a and the lid member 12b. The chassis 12a has the mechanism accommodation space 12d and the first flange part 22a disposed forward of the mechanism accommodation space 12d. The lid member 12b has the second flange part 22b forming the circular flange 22 together with the first flange part 22a, and is fixed to the chassis 12a so as to cover the mechanism accommodation space 12d. The switch member 64 may have the fixation part 64g. The fixation part 64g is fixed to the flange 22 so as to be interposed between the first flange part 22a and the second flange part 22b. According to the construction, the switch member 64 can be fixed to the flange 22 only by fixing the lid member 12b to the chassis 12a without separately providing a fixation member.

What is claimed is:

1. A spinning reel capable of casting a fishing line, comprising:
    a reel unit;
    a spool configured to wind the fishing line, the spool being mounted to the reel unit so as to be movable back and forth;
    a rotor mounted to the reel unit so as to be rotatable at least in a fishing-line winding direction to wind the fishing line about the spool;
    a bail arm mounted to the rotor so as to be pivotable between a fishing-line winding position and a fishing-line casting position, the fishing-line winding position enabling the fishing line to be wound about the spool, the fishing-line casting position enabling the fishing line to be released from the spool; and
    a hail flip mechanism configured to return the bail arm from the fishing-line casting position to the fishing-line winding position in conjunction with rotation of the rotor in the fishing-line winding direction,
    the bail flip mechanism including
        a moving member mounted to the rotor so as to be movable back and forth between a first position and a second position in conjunction with the bail arm, the moving member being, disposed rearward of the first position when disposed in the second position, the first position corresponding to the fishing-line winding position, the second position corresponding to the fishing-line casting position,
        a toggle spring member configured to urge the bail arm from the fishing-line winding position to the fishing-line casting position or from the fishing-line casting position to the fishing-line winding position across a dead center, and
        a switch member fixed to the reel unit, the switch member being configured to member toward the first position when the rotor is rotated in the fishing-line winding direction,
    the switch member having a first end, a second end, a first slope and a second slope, the second end being disposed downstream of the first end in the fishing-line winding direction of the rotor, the first slope forwardly slanting at a first slant angle along the fishing-line winding direction so as to contact the moving member disposed in the second position and to move the moving member across a position corresponding to the dead center, the second slope continuing to the first slope and forwardly slanting toward the second end at a second slant angle larger than the first slant angle.

2. The spinning reel according to claim 1, wherein the second slant angle gradually increases relative the first slant angle.

3. The spinning reel according to claim 2, wherein the switch member has a non-sloped surface extending from the second slope toward the second end.

4. The spinning reel according to claim 2, wherein the reel unit includes a chassis and a lid member, the chassis having a mechanism accommodation space and a first flange part disposed forward of the mechanism accommodation space, the lid member having a second flange part forming a circular flange together with the first flange part, the lid member being fixed to the chassis so as to cover the mechanism accommodation space, and
the switch member has a fixation part, the fixation part being fixed to the flange so as to be interposed between the first flange part and the second flange part.

5. The spinning reel according to claim 1, wherein the switch member has a non-sloped surface extending from the second slope toward the second end.

6. The spinning reel according to claim 5, wherein the switch member has a perpendicular surface, the perpendicular surface being disposed on a second-end side of the non-sloped surface so as to be perpendicular to the non-sloped surface.

7. The spinning reel according to claim 5, wherein the switch member has a third slope backwardly slanting from the non-sloped surface toward the second end along the fishing-line winding direction of the rotor.

8. The spinning reel according to claim 5, wherein the reel unit includes a chassis and a lid member, the chassis having a mechanism accommodation space and a first flange part disposed forward of the mechanism accommodation space, the lid member having a second flange part forming a circular flange together with the first flange part, the lid member being fixed to the chassis so as to cover the mechanism accommodation space, and
the switch member has a fixation part, the fixation part being fixed to the flange so as to be interposed between the first flange part and the second flange part.

9. The spinning reel according to claim 6, wherein the reel unit includes a chassis and a lid member, the chassis having a mechanism accommodation space and a first flange part disposed forward of the mechanism accommodation space, the lid member having a second flange part forming a circular flange together with the first flange part, the lid member being fixed to the chassis so as to cover the mechanism accommodation space, and the switch member has a fixation part, the fixation part being fixed to the flange so as to be interposed between the first flange part and the second flange part.

10. The spinning reel according to claim 7, wherein the reel unit includes a chassis and a lid member, the chassis having a mechanism accommodation space and a first flange part disposed forward of the mechanism accommodation space, the lid member having a second flange part forming a circular flange together with the first flange part, the lid member being fixed to the chassis so as to cover the mechanism accommodation space, and the switch member has a fixation part, the fixation part being fixed to the flange so as to be interposed between the first flange part and the second flange part.

11. The spinning reel according to claim 1, wherein the reel unit includes a chassis and a lid member, the chassis having a mechanism accommodation space and a first flange part disposed forward of the mechanism accommodation space, the lid member having a second flange part forming a circular flange together with the first flange part, the lid member being fixed to the chassis so as to cover the mechanism accommodation space, and the switch member has a fixation part, the fixation part being fixed to the flange so as to be interposed between the first flange part and the second flange part.

\* \* \* \* \*